Aug. 10, 1965  C. J. WHITFIELD ET AL  3,199,605
SHAKER—WINDROWER
Filed March 26, 1962  2 Sheets-Sheet 2
Fig. 2
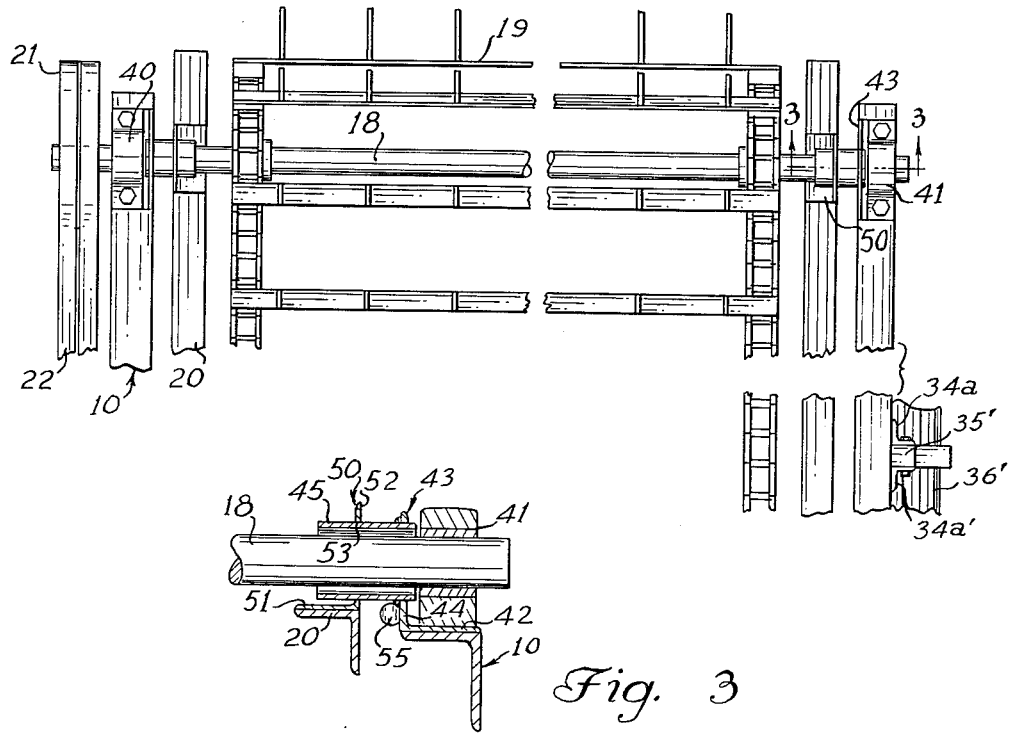
Fig. 3
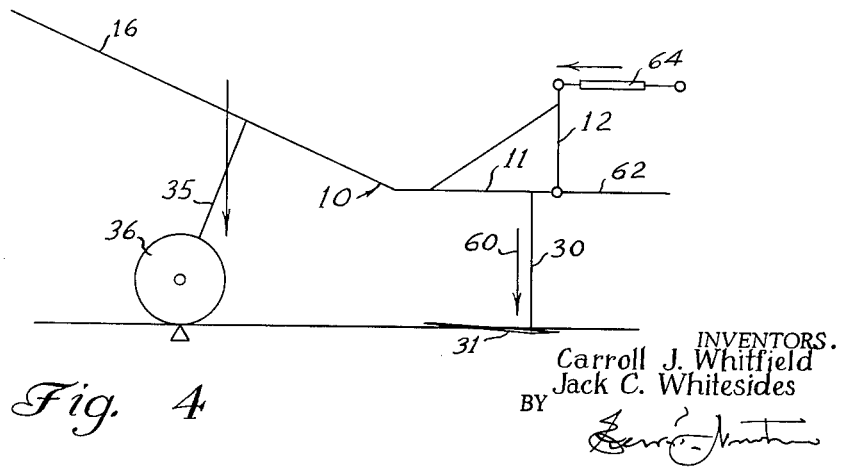
Fig. 4
INVENTORS.
Carroll J. Whitfield
Jack C. Whitesides
BY
ATTORNEY

United States Patent Office 3,199,605
Patented Aug. 10, 1965

3,199,605
SHAKER-WINDROWER
Carroll J. Whitfield and Jack C. Whitesides, Albany, Ga., assignors to Lilliston Implement Company, Albany, Ga., a corporation of Georgia
Filed Mar. 26, 1962, Ser. No. 182,187
7 Claims. (Cl. 171—101)

This invention relates to shaker-windrowers, and is more particularly concerned with an improved shaker-windrower which is simple, trouble free and efficient to operate.

In the past, shaker-windrowers have been provided with a plow for digging peanuts and with wheels adjacent the plow in order to vary the depth of the plow. With such an arrangement, however, it is necessary to adjust the distance of the wheels below the shaker frame for each change in depth of the plows. A change of depth may be necessary frequently in one field, as the ground texture and conformation vary, causing the operation to be quite time consuming. Though some shaker-windrowers are designed to be lifted and held by the hydraulic system of a tractor, thus obviating the problem, a large tractor is required; and, such a system cannot be used with the usual small farm tractor.

Also, with changes in conformation of the ground, and with variations in the density of peanut vines, the pick-up conveyor must be adjusted in order to get all of the vines. The adjustment is usually accomplished by lowering the front end of the frame for the conveyor, or rattler, with respect to the main frame. With prior art devices a change in the position of the rattler shifts the centerline of the drive pulley; therefore, the belt or chain leading to the power source must be readjusted. Again, adjustments can become very time consuming.

The device of the present invention overcomes the abovestated objections by providing wheels substantially rearwardly of the plows so that the depth of the plows may be varied simply by raising or lowering the front end of the main frame, pivoting about the wheels. The change is effected by the top link of the tractor lift system and requires no effort by the tractor hydraulic system. In the present device, when the rattler is moved relative to the main frame, the rattler frame is pivoted about the centerline of the drive pulley; therefore, the distance from the power source remains the same, and the belt or chain does not have to be readjusted.

In general terms, the device of the present invention is a shaker-windrower having plow shanks depending from the front end thereof. The wheels are far rearward of the plows, being slightly rearwardly of the center of gravity of the machine. The relatively long distance between the wheels of the frame and the plows allows vertical movement of the plows throughout the usual required range without appreciably affecting the draft angle of the plows. The rattler frame of the device is pivotally mounted on a nipple which has the same axis as the drive shaft for the pick-up conveyor; hence, pivoting the rattler frame relative to the main frame does not affect the belt or chain tension.

It is therefore an object of the present invention to provide a shaker-windrower in which the depth of plow may be varied without changing the distance of the wheels from the main frame.

It is another object of the present invention to provide a shaker-windrower in which the rattler frame may be pivoted relative to the main frame without affecting the tension of the drive chain.

A further object of the present invention is to provide a shaker-windrower which is durable in structure, efficient in operation, and well designed to meet the demands of economic manufacture.

Other and further objects, features and advantages of the present invention will become apparent from consideration of the following specification taken in conjunction with the accompanying drawings wherein like characters of reference designate the same or corresponding parts throughout the several views, and in which:

FIG. 2 is a view taken substantially along the plane of line 2—2 in FIG. 1.

FIG. 3 is an enlarged cross sectional view taken substantially along the line 3—3 in FIG. 2.

FIG. 4 is a schematic representation showing the direction of principal forces involved in the shaker-windrower of the present invention.

Figure 1:
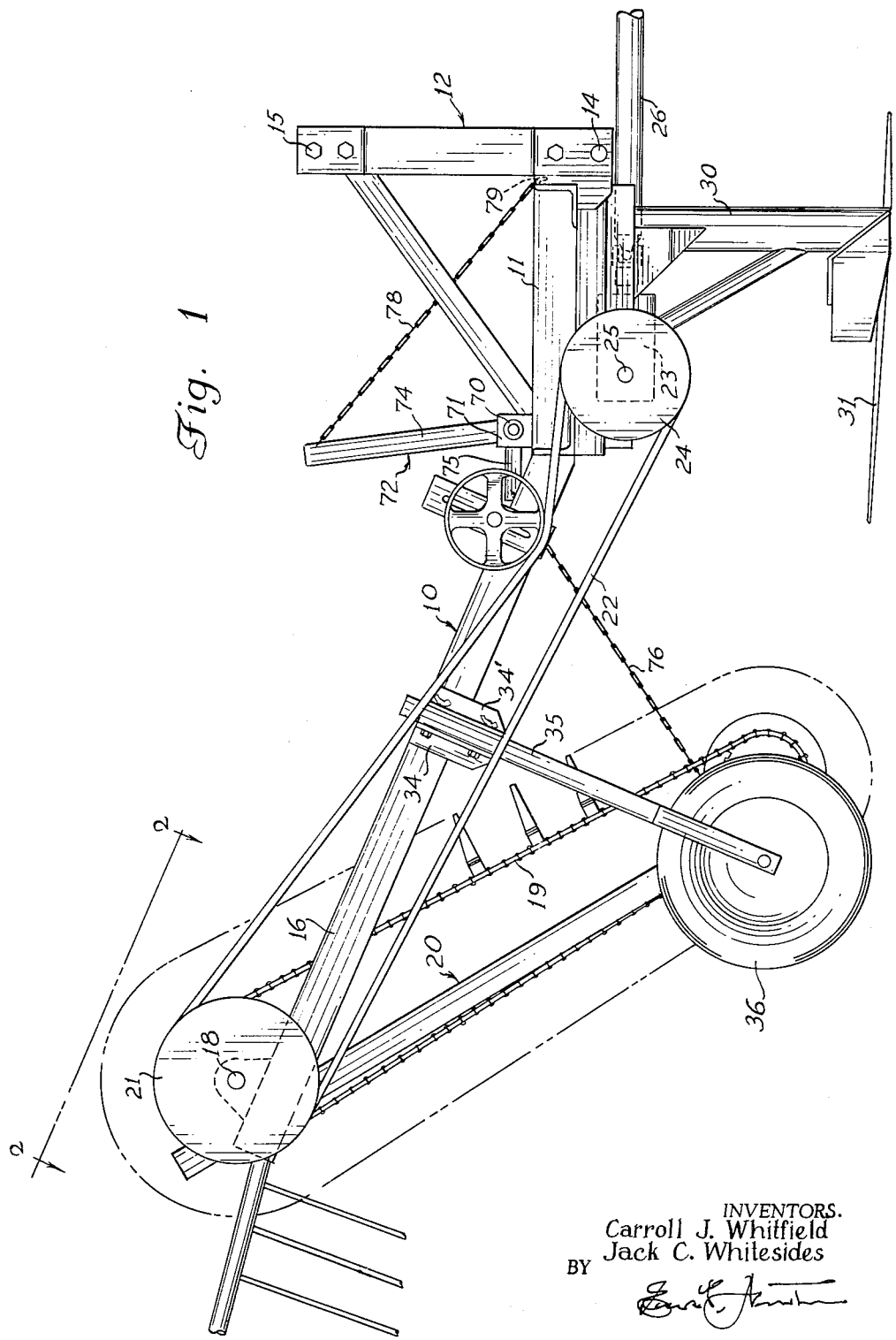
FIG. 1 is a side elevational view of a shaker-windrower constructed in accordance with the present invention.

Referring now more particularly to the drawings and to that embodiment here presented by way of illustration, the device comprises a main frame 10 having a horizontal forward section 11 which carries a conventional 3-point lift hitch 12 having lift pins 14 and a stud 15 for the top link. The inclined rear section 16 of the main frame 10 inclines upwardly and rotatably mounts, near the upper end thereof, a shaft 18 which supports the upper end of the conveyor 19 on the rattler frame 20.

A pulley 21 is attached to one end of the shaft 18 and a belt 22 passes around the pulley 21 and over the main drive pulley 24. The drive pulley 24 is attached to shaft 25 leading from a conventional gear box 23 which is fixed to the forward portion 11 of the main frame and is driven from the drive shaft 26 which is adapted to be connected to the power take off shaft of a tractor (not shown). An idler pulley bears against the belt 22 to adjust the tension thereof.

Also depending from the forward section 11 of the main frame 10 is a plow shank 30 which carries a plow 31.

On the rear section 16 of the main frame 10, flanges 34, 34′ and 34a, 34a′ receive therebetween legs 35, 35′ provided at their lower end with depth gauge wheels 36, 36′. The legs 35, 35′ and wheels 36, 36′ are so located as to be slightly rearward of the longitudinal center of gravity of the device and rearward of the trailing tip of the plow. The rather large longitudinal distance between the wheels 36, 36′, which act as the pivot point, and the plow 31 allows the plow to be raised or lowered without appreciably affecting the angle of draft of the plow.

Referring more particularly to FIGS. 2 and 3 of the drawings, it is seen that the shaft 18 is mounted on the main frame 10 by pillow block bearings 40 and 41. An angular bracket 43 is secured to the main frame 10 by a flange 42 underneath the bearing, as bearing 41, and upstanding flange 44 normal to the flange 42. An appropriate opening through the flange 44 receives a nipple 45 axially aligned about the shaft 18, but larger than the shaft 18, as best shown in FIG. 3. The nipple 45 is rigidly fixed to the flange 44, as by welding.

A bracket 50, similar to bracket 43, is fixed to the rattler frame 20 by flange 51 which is secured to the frame 20, while an upstanding flange 52 is substantially parallel to the flange 44 of bracket 43. An opening 53 through the flange 52 receives the nipple 45, and the bracket is sufficiently loose fitting on the nipple so that the bracket 50 may rotate about the nipple 45. A spacer 55 limits the amount of travel of the bracket 50 toward the bracket 43.

It will now be seen that the rattler frame 20 is free to rotate about nipple 45; and, the nipple 45 is concentric with and has the same axis as the shaft 18; hence, the rattler frame 20 pivots about a common axis with the conveyor drive pulley 21, and a change in the relative pivoted positions of the rattler frame 20 and main frame 10 will not affect the position of the conveyor drive pulley 21.

From the foregoing description, the operation of the present device should be obvious. With the shaker-windrower attached to a tractor, the wheels 36, 36' are on the ground and approximately straddle the forward end portion of the conveyor while the plows, such as plow 31, are slightly below ground. Since the wheels 36 are displaced only slightly rearwardly of the center of gravity of the machine, almost all of the weight of the device will be carried by the wheels.

Referring to FIG. 4 for a better understanding of the forces involved, the wheel acts as a fulcrum point, and the center of gravity of the machine is slightly removed forwardly of the fulcrum or axis. The downward pull of the plow 31 also causes a clockwise force, as indicated by arrow 60. The lift arm of the tractor hydraulic system, indicated at 62, is supporting no weight. The only balancing, counterclockwise force is produced by the adjustable top link of the three point lift system. The link is indicated at 64.

It is thus understood that the wheels of the shaker-windrower and the top link 64 are the sole supports for the device; therefore, to raise or lower the plow 31, an adjustment of the top link 64 is all that is required. In most cases, the change in plow depth required will not exceed plus or minus two inches; and, with the present arrangement, the change is possible without appreciably changing the draft angle of the plow 31. For very large changes, as the initial setting, the bolts in the legs 35, 35' may be removed, the legs moved to position, and the bolts reinserted to hold the legs.

When it becomes necessary to raise or lower the forward end of the rattler frame, the rattler frame 20 will pivot about the nipples 45 which have the same axis as the conveyor drive shaft 18; therefore, the center of the drive shaft will not move, but will remain at the same distance from the pulley 24 on drive shaft 25.

The means for adjusting the rattler frame is well known in the art, and includes simply a shaft 70 which is mounted between a pair of ears, such as ear 71, on the forward portion 11 of the main frame 10. A bell crank 72 is carried by the shaft 70. A chain 76 is attached to the rattler frame 20 and to one arm 75 of the bell crank 72; and, the other arm 74 of bell crank 72 acts as a lever to adjust the rattler frame. A latch chain 78 leads from the lever 74 to a hook 79 on the frame 10 in order to maintain the adjusted position of the rattler frame.

To adjust the position of the rattler frame 20, one need but to move the lever 74 toward the front of the device and unhook the latch chain 78. The bell crank may then be rotated to the position required in order that the chain 76 will hold the rattler in the desired position. The latch chain 78 is again hooked on the frame to hold the bell crank 72 in the selected position.

It will thus be seen that the shaker-windrower of the present invention is an implement which is very easy to adjust for changes in terrain, ground conditions and the like. The adjustments normally required are very quick and simple to make, and require no tools. It will be understood that the device here presented is by way of illustration only, and is meant to be in no way restrictive; therefore, numerous changes and modifications may be made, and the full use of equivalents resorted to without departing from the spirit or scope of the invention as defined by the appended claims.

We claim:

1. In a shaker-windrower including a main frame having a forward section and a rear section, a rattler frame mounted on said main frame for adjustment relative thereto, a pick-up conveyor carried by said rattler frame, a drive shaft for said conveyor rotatably mounted on said rear section, tubular means fixed to said main frame and concentrically arranged about said drive shaft for rotation of said drive shaft therein, mounting means fixed to said rattler frame and rotatable about said tubular means pivotally mounting said rattler frame thereon, drive means on said forward section of said main frame, and a drive connection between said drive means and said drive shaft.

2. In a shaker-windrower including a main frame having a forward section and an inclined rear section, a rattler frame mounted on said main frame for adjustment relative thereto, a pick-up conveyor carried by said rattler frame, a drive shaft for said conveyor rotatably mounted on said main frame near the upper end thereof, tubular means fixed to said main frame and concentrically arranged about said drive shaft and radially spaced therefrom, mounting means fixed to said rattler frame and rotatable about said tubular means pivotally mounting said rattler frame thereon, drive means on said forward section of said main frame, and a drive connection between said drive means and said drive shaft.

3. In a shaker-windrower including a main frame having a forward section and an inclined rear section, a rattler frame mounted on said main frame for adjustment relative thereto, a pick-up conveyor carried by said rattler frame, a drive shaft for said conveyor rotatably mounted on said main frame near the upper end thereof, a pair of nipples fixed to said main frame on opposite sides of said rattler frame and concentric with said drive shaft, mounting means fixed to said rattler frame and rotatable about said nipples pivotally mounting said rattler frame thereon, drive means on said forward section of said main frame, and a drive connection between said drive means and said drive shaft.

4. In a shaker-windrower including a main frame having a forward section and an inclined rear section, a forwardly and downwardly inclined rattler frame mounted on said main frame for adjustment relative thereto, a pick-up conveyor carried by said rattler frame, a drive shaft for said conveyor rotatably mounted on said main frame near the upper end thereof, tubular means fixed to said main frame on opposite sides of said rattler frame and concentric with said drive shaft, mounting means fixed to the upper end portion of said rattler frame and rotatable about said tubular means pivotally mounting said rattler frame thereon, drive means on said forward section of said main frame, a drive connection between said drive means and said drive shaft, a plow carried below said forward section, and a support wheel adjustably mounted below said inclined rear section transversely adjacent the lower portion of said rattler frame.

5. In a shaker-windrower including a main frame having a forward section and an inclined rear section, a forwardly and downwardly inclined rattler frame mounted on said main frame for adjustment relative thereto, a pick-up conveyor carried by said rattler frame, a drive shaft for said conveyor rotatably mounted on said main frame near the upper end thereof, a pair of nipples fixed to said main frame on opposite sides of said rattler frame and concentric with said drive shaft, mounting means fixed to the upper end portion of said rattler frame and rotatable about said nipples pivotally mounting said rattler frame thereon, drive means on said forward section of said main frame, a drive connection between said drive means and said drive shaft, a plow carried below said forward section, and a support wheel adjustably mounted on said inclined rear section transversely adjacent the lower portion of said rattler frame aft said plow and slightly rearward of the center of gravity of the machine.

6. In a shaker-windrower, a main frame, a transverse rattler drive shaft at the rear end portion of said main frame, a pair of opposed pillow block bearings on the end portion of said main frame for supporting for rotation said rattler drive shaft, a pair of brackets inwardly of said bearings on said main frame, a pair of nipples carried by said brackets and surrounding said rattler drive shaft, a rattler frame rotatably supported by one end by said nipples free from engagement with said rattler drive shaft, a continuous rattler conveyor carried by said rattler frame and driven by said rattler drive shaft, said conveyor and said frame extending downwardly and forwardly from said rattler drive shaft, legs adjustably carried by said main frame and protruding downwardly therefrom, wheels carried on the ends of said legs for engagement with the ground, the lower portion of said conveyor and said rattler frame terminating adjacent said wheels, said legs and said wheels and said conveyor being so dimensioned and positioned with respect to each other that the pivoting of said shaker-windrower about said wheels will not appreciably vary the height of said lower portion of said conveyor with respect to the ground, a plow extending downwardly from said main frame in front of said conveyor and means for adjusting the angular position of said rattler frame.

7. In a shaker-windrower, a main frame having a forward section and a rear section inclined rearwardly and upwardly from the rear portion of said forward section, said rear section being appreciably longer than said forward section, a lift hitch secured to the forward end of said forward section, a transverse rattler drive shaft at the rear end portion of said rear section of said main frame, a pair of opposed pillow block bearings on the end portion of said rear frame for supporting for rotation said rattler drive shaft, means for driving said rattler drive shaft, a pair of brackets inwardly of said bearings on said main frame, a pair of inwardly protruding nipples carried by said brackets and surrounding said rattler drive shaft, a rattler frame rotatably supported by said nipples free from engagement with said rattler drive shaft, a continuous rattler conveyor carried by said rattler frame and driven by said rattler drive shaft, said conveyor and said frame extending downwardly and forwardly from said rattler drive shaft, legs adjustably carried by said rear section of said main frame intermediate the ends thereof, said legs protruding downwardly and rearwardly from said rear section of said main frame, wheels carried on the ends of said legs for engagement with the ground, the lower portion of said conveyor and said rattler frame terminating transversely between said wheels, said legs and said wheels and said conveyor being operatively associated in such relationship that the pivoting of said shaker-windrower about said wheels will not appreciably vary the height of said lower portion of said conveyor, and a plow extending downwardly from an intermediate portion of said forward section of said main frame.

References Cited by the Examiner

UNITED STATES PATENTS

| | | | |
|---|---|---|---|
| 2,524,109 | 10/50 | Knowles | 171—141 X |
| 2,562,659 | 7/51 | Carter et al. | 171—101 X |
| 2,952,321 | 9/60 | Lyle et al. | 171—101 X |
| 2,999,547 | 9/61 | Long | 171—101 |

T. GRAHAM CRAVER, *Primary Examiner.*

ANTONIO F. GUIDA, ARNOLD RUEGG, *Examiners.*